(12) United States Patent
Axell et al.

(10) Patent No.: US 8,711,733 B2
(45) Date of Patent: Apr. 29, 2014

(54) INDICATING TRANSFER IN AN IMS NETWORK

(75) Inventors: Jorgen Axell, Danderyd (SE);
Ros-Marie Furtenback, Johanneshov (SE); Jan Holm, Gavle (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 122 days.

(21) Appl. No.: 12/992,730

(22) PCT Filed: Nov. 8, 2010

(86) PCT No.: PCT/EP2010/067027
§ 371 (c)(1),
(2), (4) Date: Oct. 10, 2011

(87) PCT Pub. No.: WO2012/062350
PCT Pub. Date: May 18, 2012

(65) Prior Publication Data
US 2012/0213127 A1    Aug. 23, 2012

(51) Int. Cl.
*H04L 12/16* (2006.01)
*H04Q 11/00* (2006.01)

(52) U.S. Cl.
USPC ........................................................ 370/259

(58) Field of Classification Search
USPC ........................................................ 370/259
See application file for complete search history.

(56) References Cited

U.S. PATENT DOCUMENTS

2009/0016330 A1* 1/2009 Witzel et al. .................. 370/352
2011/0141947 A1* 6/2011 Li et al. ......................... 370/259

OTHER PUBLICATIONS

3rd Generation Partnership Project: Technical Specification Group Core Network and Terminals: Explicit Communication Transfer (ECT) using IP Multimedia (IM) Core Network (CN) Subsystems: Protocol Specification (Release 10), 3GPP TS 24.629 version 10.0.0 (Jun. 14, 2010).*
International Search Report, Application No. PCT/EP2010/067027, Sep. 22, 2011.
"$3^{rd}$ Generation Partnership Project; Technical Specification Group Core Network and Terminals; Explicit Communication Transfer (ECT) Using IP Multimedia (IM) Core Network (CN) Subsystem; Protocol Specification (Release 10)," 3GPP Standard; 3GPP TS 24.629, $3^{rd}$ Generation Partnership Project (3GPP) Mobile Competence Centre: 650, Route DES Lucioles; F-06921 Sophia-Antipolis Cedex; France, No. V10.0.0, Jun. 14, 2010, pp. 1-26, retrieved Jun. 14, 2010.

(Continued)

*Primary Examiner* — Abdullah Riyami
*Assistant Examiner* — Brian Cox
(74) *Attorney, Agent, or Firm* — Myers Bigel Sibley & Sajovec, P.A.

(57) ABSTRACT

A method and apparatus for indicating to a node in an IMS network a transfer between two endpoints. A node in a first network determines that a communication session is to be transferred from a first endpoint to a second endpoint. The node includes an indication of at least one of the endpoints, and an explicit communication transfer indicator, in a message. The message is then sent towards the node in the IMS network. This allows the node in the IMS network to determine that a transfer has taken place and, if necessary, take further action.

16 Claims, 5 Drawing Sheets

(56) References Cited

OTHER PUBLICATIONS

"3rd Generation Partnership Project; Technical Specification Group Services and System Aspects; IP Multimedia Subsystem (IMS) Centralized Services; Stage 2 (Release 10)," 3GPP Standards; 3GPP TS 23.292, 3rd Generation Partnership Project (3GPP), Mobile Competence Centre; 650, Route DES Lucioles; F-06921 Sophia-Antipolis Cedex; France, No. V10.2.0, Sep. 29, 2010, pp. 1-110, retrieved Sep. 29, 2010.

Maki, T: "Lawful Interception in 3G IP Multimedia Subsystem," Internet Citation, Aug. 26, 2003, XP002327618, retrieved Aug. 26, 2003.

* cited by examiner

INDICATING TRANSFER IN AN IMS NETWORK

CROSS REFERENCE TO RELATED APPLICATION

This application is a 35 U.S.C. §371 national stage application of PCT International Application No. PCT/EP2010/067027, filed on 8 Nov. 2010, the disclosure and content of which is incorporated by reference herein in its entirety.

TECHNICAL FIELD

The invention relates to the field of indicating a transfer of a communication in an IP Multimedia Subsystem network.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session.

The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

FIG. 1 illustrates schematically how the IMS fits into the mobile network architecture in the case of a General Packet Radio Service (GPRS) access network. As shown in FIG. 1a control of communications occurs at three layers (or planes). The lowest layer is the Connectivity Layer 1, also referred to as the bearer plane and through which signals are directed to/from user equipment, UE, accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5, which operate as SIP proxies within the IMS in the middle, Control Layer 4. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. The top, Application Layer 6 includes the IMS service network 3b. Application Servers (ASs) 7 are provided for implementing IMS service functionality Lawful interception is the interception of private communications between users by a law enforcement agency (LEA) such as a police or intelligence service. It is a requirement of lawful interception in most jurisdictions that the lawful interception does not affect the service provided to the users. Most jurisdictions require public telephony service providers to offer lawful interception access to LEAs. Vendors of switching equipment for public telecommunications networks are required to build the necessary support functionality into any network elements they manufacture and install.

It is a requirement in many jurisdictions to be able to perform legal intercept on a diverted communication if the diverting user is the intercept target, and also to stop the legal intercept in the event that the intercept target transfers the communication to another user. However, there is no mechanism in an IMS network for a node to detect that a transfer of a communication has occurred, and so existing IMS networks do not support lawful interception in the event that the intercept target transfers the communication to another user.

SUMMARY

In order to allow nodes in an IMS network to be informed that a transfer has occurred between two endpoints, an explicit communication transfer indicator is introduced which can be used by IMS nodes to determine that a transfer has taken place. According to a first aspect, there is provided a method of indicating to a node in an IMS network a transfer between two endpoints. A node in a first network determines that a communication session is to be transferred from a first endpoint to a second endpoint.

The node includes an indication of at least one of the endpoints, and an explicit communication transfer indicator, in a message. The message is then sent towards the node in the IMS network. This allows the further node to determine that a transfer has taken place and, if necessary, take further action.

The explicit communication transfer indicator optionally comprises an indication of a type of transfer, as this provides more information to the node in the MIS network.

As IMS networks use SIP signalling, the explicit communication transfer indicator is optionally included in a header in a Session Initiation Protocol message. As a further option, the explicit communication transfer indicator is included in a Call-Info header, the indicator comprising a purpose parameter and a further parameter including an indication of a reason for the transfer. Note that the first network is optionally the IMS network.

In an optional embodiment, the first network is a circuit switched network, wherein a message from the circuit switched network to the IMS network includes the explicit communication transfer indicator. It will be appreciated that the further network may be a PS network other than an IMS network. In this case, the message from the circuit switched network is optionally sent via a gateway node. The gateway node is arranged to map an indication of the type of transfer in the message to a parameter usable by the IMS network. This allows transfer of a communication between endpoints in networks other than an IMS network to be signalled to a node in an IMS network. According to a further option, the method comprises mapping an alerting type to a "blind" parameter value and an active type to a "consultative" parameter value.

As an option, a node in the IMS network can determine the presence of the explicit communication transfer indicator after it has received a message containing the explicit communication transfer indicator and, as a result of the determination, inform a Lawful Intercept node that a transfer has taken place.

The indication of at least one of the endpoints optionally comprises any of an address, and an anonymous value. The use of an anonymous value allows an endpoint to preserve its privacy.

According to a second aspect, there is provided a node for use in a communication network. The node is provided with a processor for determining that a communication session is to be transferred from a first endpoint to a second endpoint. The processor is further arranged to include in a message an indication of at least one of the endpoints and an explicit communication transfer indicator. A transmitter is also provided for sending the message towards a node in an IMS network.

As an option, the explicit communication transfer indicator is included in a header in a SIP message. As a further option, the explicit communication transfer indicator is included in a Call-Info header, the indicator comprising a purpose parameter and a further parameter including an indication of a reason for the transfer.

According to a third aspect, there is provided a node for use in an IMS communication network. The node is provided with a receiver for receiving from a further node a message, the message including an explicit communication transfer indicator indicating that a communication session has been transferred from a first endpoint to a second endpoint, and an indication of at least one of the endpoints. A processor is also provided for determining the presence of the explicit communication transfer indicator and taking further action.

As an option, the node is also provided with a transmitter for sending to a Lawful Intercept node a message that informs the Lawful Intercept node that the communication session has been transferred from a first endpoint to a second endpoint.

According to a fourth aspect, there is provided a gateway node for use in an IMS communication network. The gateway node is provided with a receiver for receiving a message from a further network. The message comprises an explicit communication transfer indicator indicating that a communication session has been transferred from a first endpoint to a second endpoint, an indication of at least one of the endpoints and an indication of the communication transfer type. A processor is provided for mapping the indication of the communication transfer type to a further indication of the communication type usable by the IMS communication network. The processor is also arranged to generate a SIP message, the SIP message comprising an explicit communication transfer indicator indicating that the communication session has been transferred from the first endpoint to the second endpoint, an indication of at least one of the endpoints and the further indication of the communication transfer type.

According to a fifth aspect, there is provided a computer program, comprising computer readable code means which, when run on a node, causes the node behave as any of the nodes described above in the second, third and fourth aspects.

According to a sixth aspect, there is provided a computer program product comprising a computer readable medium and a computer program as described above in the fifth aspect, wherein the computer program is stored on the computer readable medium.

DETAILED DESCRIPTION

Figure 1:
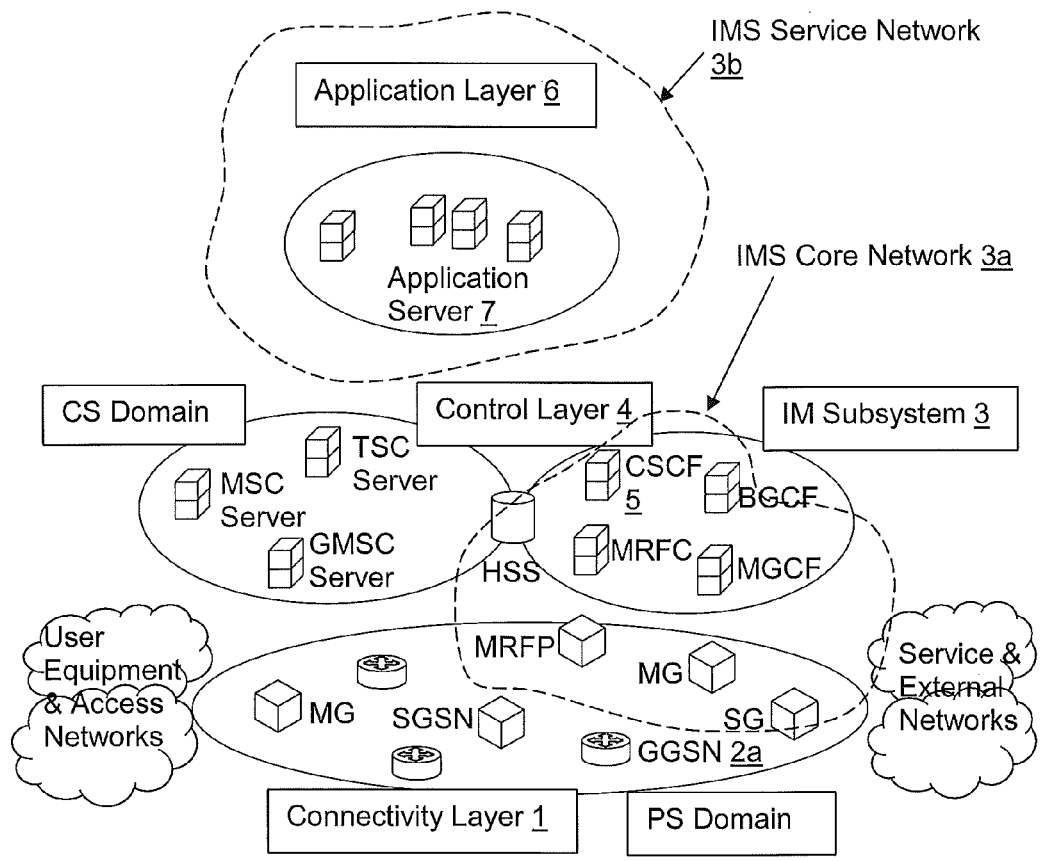
FIG. 1 illustrates schematically in a block diagram an IMS network in association with a mobile network architecture of a General Packet Radio Service (GPRS) access network.
Figure 2:
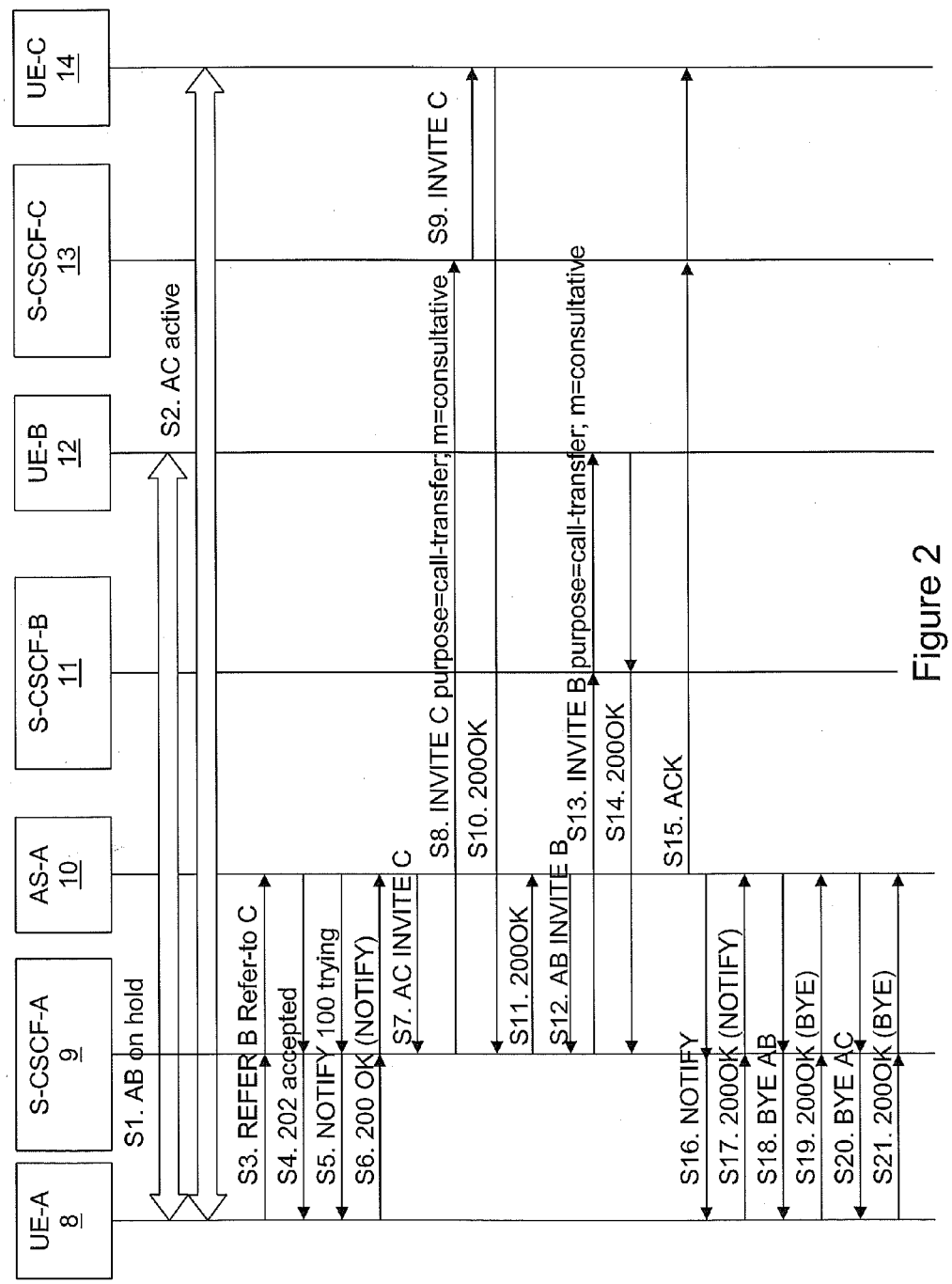
FIG. 2 is a signalling diagram illustrating signalling according to an embodiment of the invention.

Referring to FIG. 2 herein, there is illustrated a network in which a first User Equipment, UE-A 8 has a communication session with UE-B 11. A Multimedia Telephony Application Server AS-A 10 is shown along with a Serving Session Control Function S-CSCF-A 9 that serves UE-A 8. A further S-CSCF-B 11 is shown that serves UE-B 12. UE-C 14 is also shown that is served be S-CSCF-C 13. In the example of FIG. 2, UE-A 8 is subject to Lawful Interception (LI) and the communication session between UE-A 8 and UE-B 12 is to be transferred such that it proceeds between UE-B 12 and UE-C 14. UE-B 12 and UE-C 14 are not subject to Lawful Interception. The following numbering corresponds to the numbering of FIG. 2:

S1. A media stream associated with a dialogue between UE-A 8 and UE-B 12 is put on hold as the communication is being transferred from UE-A 8 to UE-C 14.

S2. A media stream associated with a dialogue between UE-A 8 and UE-C 14 is active.

S3. A SIP REFER is sent from UE-A 8 towards UE-B 12 via S-CSCF-A 9. The S-CSCF-A 9 determines that the message is to be forwarded to Application Server AS-A 10 informing AS-A 10 that the communication session is to be transferred from UE-A 8 to UE-C 14. The SIP REFER includes the instruction Refer-to C to identify UE-C 14.

S4. AS-A 10 decides to set up the session between UE-B 12 and UE-C 14 using third party control methods. AS-A 10 responds with a SIP 202 Accepted message to confirm that it accepts the transfer. The SIP 202 Accepted message is sent to UE-A 8 via S-CSCF-A 9.

S5. AS-A 10 sends a message to UE-A 8 via S-CSCF-A 9, informing UE-A 8 that AS-A 10 is attempting to establish a communication session with UE-C 14.

S6. UE-A 8 responds to AS-A 10 via S-CSCF-A 9 with a SIP 200OK message.

S7. AS-A 10 sends an INVITE to S-CSCF-A to invite UE-C 14.

S8. S-CSCF-A 9 sends the SIP INVITE to S-CSCF-C 11. S-CSCF-A 9 includes in the SIP INVITE a header field. The header field includes an Explicit Communication Transfer (ECT) indicator to indicate that the signalling relates to a call transfer from another UE. In this example, the header field used is a Call-Info Header. The Call-Info header field includes the address of an endpoint (in this example, the URI for UE-B), as the transferred session will be between UE-B 12 and UE-C 14. It also includes a purpose parameter and an "m" parameter. The "m" parameter may indicate "blind" or "consultative". Those parameter values correspond to two types of transfer specified within Multimedia Telephony in IMS, although other values could be used provided they indicate the type of transfer. In this example, the purpose parameter=call transfer. The ECT indicator is typically used in UPDATE or re-INVITE messages that are used when a communication session is transferred. An example of an ECT indicator included in the Call-Info header field is Call-Info:<URI>; purpose=call transfer; m=consultative. In this example, the purpose and m are parameters in the header field. Note that in an alternative embodiment, these parameters may be defined as part of a URI as follows: <URI; purpose=call-transfer; m=consultative>.

S9. The SIP INVITE is forwarded from S-CSCF-C 13 to UE-C 14.

S10. UE-C 14 responds to S-CSCF-A 9 with a SIP 2000K indicating that UE-C 14 will accept the transfer of the communication session with UE-B 12 from UE-A 8.

S11. S-CSCF-A 9 sends a SIP 200OK to AS-A 10.

S12. AS-A 10 sends a SIP INVITE to S-CSCF-A 9 that includes an ECT indicator. The ECT indicator in this example indicates m=consultative, purpose=call transfer and the URI of UE-C 14.

S13. S-CSCF-A 9 sends the SIP INVITE of step S12 to UE-B 12 via S-CSCF-B 11.

S14. UE-B 12 replies to S-CSCF-A 9 via S-CSCF B 11 with a SIP 200OK. At this point, UE-B 12 stops sending media to UE-A 8. An acknowledgement for this message is not shown to improve the clarity of the figure. Furthermore, at this point S-CSCF-A 9 is aware from the presence of the ECT indicator that UE-A 8 is no longer receiving media from UE-B 12. In this example, as UE-A 8 is subject to LI, S-CSCF-A 9 informs an LI node (not shown) that LI is no longer required for this communication, although it will be appreciated that any node in the IMS network may make use of the ECT indicator.

S15. AS-A 10 sends a SIP ACK to UE-C 14.

S16-S21. AS-A 10 and UE-A 8 exchange a series of NOTIFY and 200OK messages relating to the communication sessions, to close down the communications session with UE-A 8.

Figure 3:
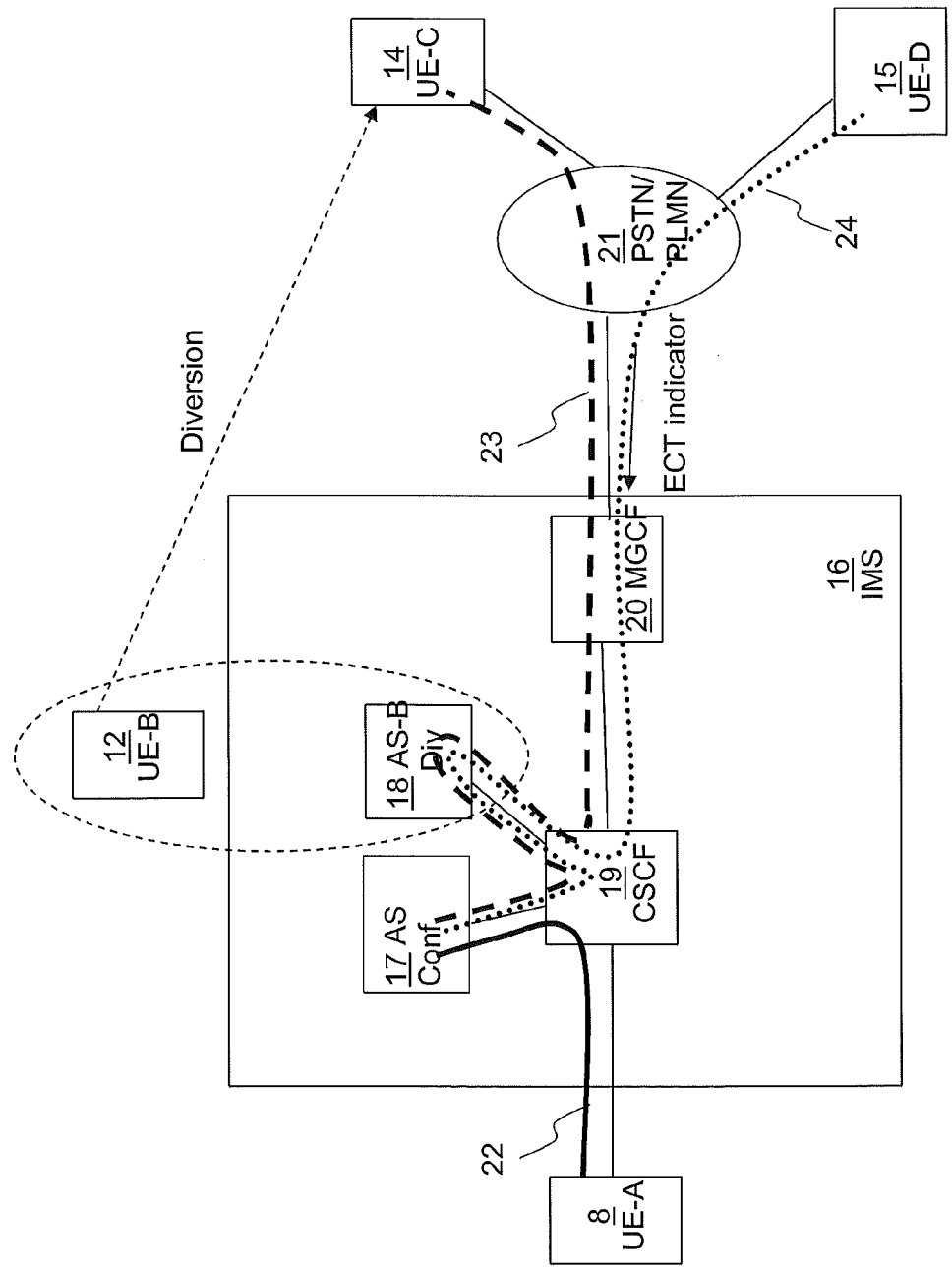
FIG. 3 illustrates schematically a network architecture and signalling according to an embodiment of the invention.

The ECT indicator can be used by any node. For example, a border node, AS-A or a CSCF may use the ECT indicator as a trigger to inform a LI node stop LI in the event that a communication session is transferred from a UE subject to LI to a UE that is not subject to LI. FIG. 3 herein indicates an exemplary call flow.

While the example above has been described with reference to LI, it will be appreciated that the ECT indicator may be used to indicate a transfer for other purposes. For example, a gateway node, such as a Media Gateway Control Function (MGCF), can use an ECT indicator to inform nodes in an IMS core network that a transfer has taken place in a circuit switched network such as a Public Switched Telephony Network (PSTN) network. A PSTN network defines two types of transfer, known as "alerting" and "active". "Alerting" can be mapped to the "blind" m parameter value in the IMS network, and "active" can be mapped to "consultative" in the IMS network. This allows, for example, LI to be stopped in an IMS network even where one of the parties is accessing the IMS network from a PSTN network.

FIG. 3 gives an example of a call flow. In this example, four UEs are shown, UE-A 8, UE-B 11, UE-C 13 and UE-D 14. UE-A 8 is attached to an IMS network 15 that includes a Conference AS 16 that handles conference communication session, a diversion AS 17, and a CSCF 18 that serves UE-A 8. A gateway node such as a Media Gateway Control Function (MGCF) 20 is used to communicate with a PSTN network 20 to which UE-C 14 and UE-D 15 are attached.

In the example of FIG. 3, UE-A 8 is the owner of a conference communication session, and would like UE-B 12 to participate in the conference. UE-B 12 is currently subject to LI. When UE-A 8 invites UE-B 12 to the conference, UE-B 12 has a call diversion to UE-C 14. The call signalling for the conference call from UE-A 8 to the Conference AS 17 is illustrated by line 22, and the call signalling for the conference call between UE-C 14 and the Conference AS 17 is illustrated by dashed line 23. As UE-B 12 has only initiated a call diversion to UE-C 14, the call is still subject to LI and no ECT indicator is necessary in the signalling for the diversion.

UE-C 14 subsequently wishes to transfer the communication session to UE-D 15. UE-D 15 is owned by a different user, who is not subject to LI. UE-C 14 initiates the transfer. An ECT indicator is included in the transfer signalling by a network node supporting UE-C 14. Once the transfer has been completed, the call signalling between UE-D 15 and the Conference AS 17 is illustrated by the dotted line 24. The PSTN network 21 to which UE-C 14 and UE-D 15 are attached sends a message to the MGCF 20. The message includes an ECT indicator in a format specific to PSTN. In the embodiment described in FIG. 2, where the ECT indicator is sent as a Call-Info header, the MGCF 20 maps the PSTN transfer type (alerting or active) to an m parameter (blind or consultative) and the signalling is forwarded to the CSCF 19 and the Conference AS 17. Either of the CSCF 19 and the Conference AS 17 may inform a LI node (not shown) that the call has been transferred and that LI should be stopped.

Figure 4:
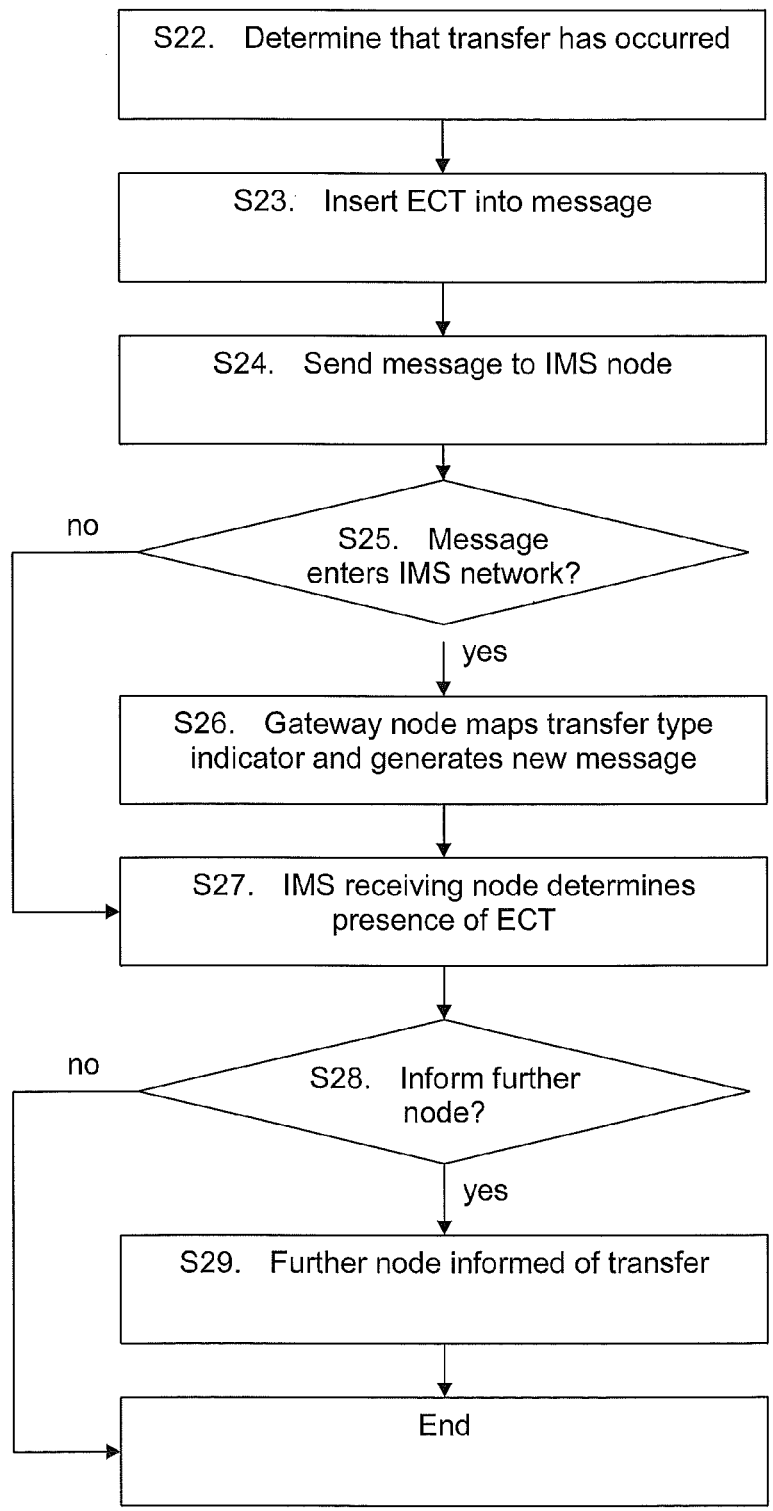
FIG. 4 is a flow diagram showing steps according to an embodiment of the invention.

Referring now to FIG. 4, there is shown a flow diagram illustrating features of an embodiment of the invention. The following numbering corresponds to the numbering of FIG. 4:

S22. A node determines that a transfer between two endpoints in a network has occurred. The endpoints may be in an IMS network or another type of network such as a PSTN network.

S23. The node generates a message with an ECT indicator in it or inserts an ECT indicator into an existing message, along with an address (URI) of at least one of the endpoints.

S24. The message is sent towards an IMS node.

S25. If the message arises at an IMS node from a non-IMS network, then the ECT indicator may need to be mapped to a form understandable by the IMS network.

S26. In this case, a gateway node (such as a MGCF) maps the ECT indicator as described above.

S27. A node in the IMS network determines the presence of the ECT indicator in a message, and understands from this that a transfer between two endpoints has occurred.

S28. In some instances, the node in the IMS network will need to inform a further node, such as a LI node, that the transfer has taken place.

S29. In this case, the node in the IMS network sends a message to the further node.

Figure 5:
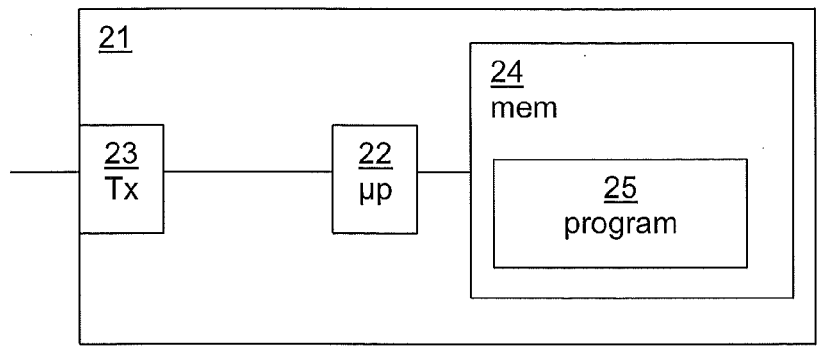
FIG. 5 illustrates schematically in a block diagram a node according to an embodiment of the invention.

Referring to FIG. 5, there is illustrated a node that can include an ECT indicator in a message. An example of such a node is an AS. The node 21 is provided with a processor 22 which is capable of determining that a communication session between two endpoints is to be transferred. The processor is arranged to include in a message the ECT indicator and an address of one of the endpoints. A transmitter 23 is provided for sending the message towards a node in the IMS network, so that the IMS network node can determine, using the ECT indicator, that a transfer has occurred.

In an embodiment of the invention, the node 21 is also provided with a computer readable medium in the form of a memory 24. The memory may be used to store a computer program 25 which, when executed by the processor 22, causes the node 21 to behave as described.

Figure 6:
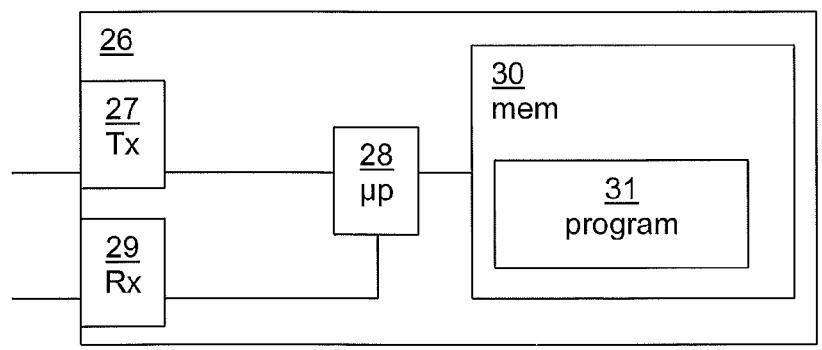
FIG. 6 illustrates schematically in a block diagram an IMS node according to an embodiment of the invention.

FIG. 6 illustrates an IMS node 26 for use in an IMS network. The IMS node 26 is provided with a receiver 27 for receiving a message that includes the ECT indicator. A processor 28 is arranged to determine the presence of the ECT indicator and, from that, determine that a communication has been transferred and if necessary, take further action. In an embodiment of the invention, the further action includes informing another node, such as an LI node, of the transfer. In this case, a transmitter 29 is also provided for sending a message to the other node informing it of the transfer.

In an embodiment of the invention, the IMS node 26 is also provided with a computer readable medium in the form of a memory 30. The memory may be used to store a computer program 31 which, when executed by the processor 28, causes the IMS node 26 to behave as described above.

Figure 7:
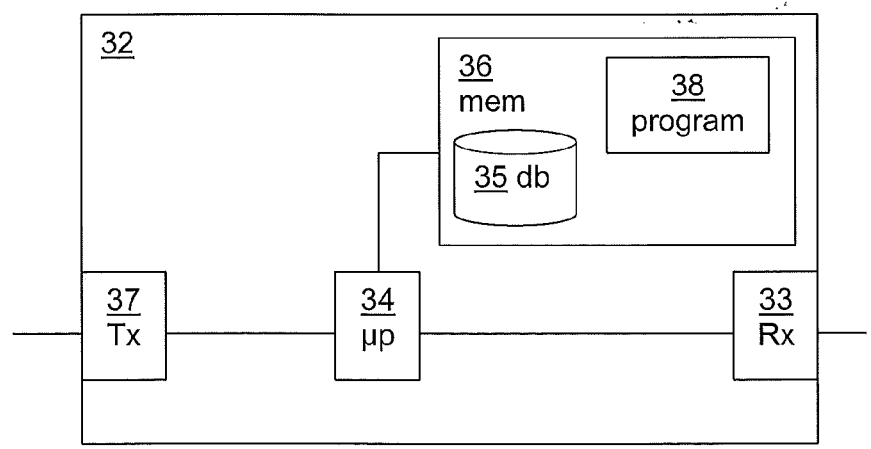
FIG. 7 illustrates schematically in a block diagram a gateway node according to an embodiment of the invention.

FIG. 7 shows a gateway node 32 for use in receiving a message from a network that is to be forwarded to nodes in an IMS network. The gateway node 32 is provided with a receiver 33 for receiving a message from the further network (that may be a CS network or a different type of PS network). The message includes the ECT indicator and an indication of the communication type. A processor 34 is used for mapping the indication of the communication type to a further indication of the communication type usable by the IMS. This may be done by, for example, obtaining mappings from a database 35 stored on a computer readable medium in the form of a memory 36. The processor 34 is also arranged to generate a SIP message that includes the ECT indicator and the further indication of the communication type. A transmitter 37 is also provided for forwarding the SIP message to another node in the IMS network. An example of such a gateway node is a MGCF.

The memory 36 of the gateway node 32 may also be used to store a computer program 38 which, when executed by the processor 34, causes the gateway node 32 to behave as described above.

The invention has several advantages. A key advantage is the ability to support the legal requirements for LI in most jurisdictions. In addition, the use of an ECT indicator is not limited to communications exclusively in an IMS network, but can be used to indicate call transfer between devices in other types of network to other IMS nodes. Examples of such networks include a PSTN network and mobile networks. This allows the invention to work with legacy networks as IMS networks are being extended.

Other services within the IMS network may also benefit from this indication, as different supplementary services may influence each other. The presence of an ECT indicator can avoid any unwanted service interactions.

It will be appreciated by the person of skill in the art that various modifications may be made to the above-described embodiments without departing from the scope of the invention. For example, the above description uses the example of sending an ECT indicator as part of a Call-Info header, although it will be appreciated that alternative ways of signalling the ECT indicator may be used, such as the use of other headers or sending the message as an XML body in a SIP message.

In some circumstances, it may be required to preserve the anonymity of one of the endpoints. In this case the address of the endpoint to which privacy is applied may be replaced by an anonymous value or marked as anonymous.

The following abbreviations have been used in this specification:
ECT Explicit Communication Transfer
IMS IP Multimedia Subsystem
IP Internet Protocol
LI Lawful Intercept
MGCF Media Gateway Control Function
MTAS Multimedia Telephony Application server
PSTN Public Switched Telephony Network
SIP Session Initiation Protocol
UE User Equipment (could be a phone)

The invention claimed is:

1. A method of indicating to a node in an IP Multimedia Subsystem network a transfer between two endpoints the method comprising:
   at a node in a first network, determining that a communication session is to be transferred from a first endpoint to a second endpoint;
   including in a message an indication of at least one of the first and second endpoints and an explicit communication transfer indicator; and
   sending the message towards the node in the IP Multimedia Subsystem network
   via a gateway node,
   wherein the gateway node is arranged to map an indication of the type of transfer in the message to a parameter usable by the IP Multimedia Subsystem network to determine the type of transfer, and
   wherein to map the indication of the type of transfer comprises mapping an alerting type to a blind parameter value and an active type to a consultative parameter value.

2. The method according to claim 1, in which the explicit communication transfer indicator comprises an indication of the type of transfer.

3. The method according to claim 1, wherein the explicit communication transfer indicator is included in a header in a Session Initiation Protocol message.

4. The method according to claim 3, wherein the explicit communication transfer indicator is included in a Call-Info header, the indicator comprising a purpose parameter and a further parameter including an indication of a reason for the transfer.

5. The method according to claim 1, further comprising, at a another node in the IP Multimedia Subsystem network, determining the presence of an explicit communication transfer indicator and, as a result of the determination, informing a Lawful Intercept node that a transfer has taken place.

6. The method according to claim 1, wherein the indication of at least one of the first and second endpoints comprises any of an address, and an anonymous value.

7. A computer program product, comprising a non-transitory computer readable medium including computer readable code therein, the computer readable code is configured to cause the node to carry out the method of claim 1.

8. The method according to claim 1,
   wherein the first network is a circuit switched network, and
   wherein the message from the circuit switched network to the IP Multimedia Subsystem network includes the explicit communication transfer indicator.

9. A node for use in a communication network, the node comprising:
   a processor for determining that a communication session is to be transferred from a first endpoint to a second endpoint;
   the processor being further arranged to include in a message an indication of at least one of the endpoints and an explicit communication transfer indicator; and
   a transmitter for sending the message towards a node in an IP Multimedia Subsystem network via a gateway node,
   wherein the gateway node is arranged to map an indication of the type of transfer in the message to a parameter usable by the IP Multimedia Subsystem communication network to determine the type of transfer, and wherein to map the indication of the type of transfer comprises mapping an alerting type to a blind parameter value and an active type to a consultative parameter value.

10. The node according to claim 9, wherein the explicit communication transfer indicator is included in a header in a Session Initiation Protocol message.

11. The node according to claim 9, wherein the explicit communication transfer indicator is included in a Call-Info header, the indicator comprising a purpose parameter and a further parameter including an indication of a reason for the transfer.

12. A computer program product, comprising computer readable code that when run on the node causes the node to be configured as recited in claim 9.

13. The computer program product of claim 12, further comprising a non-transitory computer readable medium that stores the computer readable code.

14. A node for use in an IP Multimedia Subsystem communication network, the node comprising:
 a receiver for receiving from a further node a message, the message including an explicit communication transfer indicator indicating that a communication session has been transferred from a first endpoint to a second endpoint and an indication of at least one of the endpoints; and
 a processor for determining the presence of the explicit communication transfer indicator and taking further action responsive to the determination,
 wherein the receiver is configured to receive the message from the further node via a gateway node, and
 wherein the gateway node is arranged to map an indication of the type of transfer in the message to a parameter usable by the IP Multimedia Subsystem communication network to determine the type of transfer, and
 wherein to map the indication of the type of transfer comprises mapping an alerting type to a blind parameter value and an active type to a consultative parameter value.

15. The node according to claim 14, wherein the node further comprises:
 a transmitter for sending to a Lawful Intercept node a message informing the Lawful Intercept node that the communication session has been transferred from the first endpoint to the second endpoint.

16. A gateway node for use in an IP Multimedia Subsystem communication network, the gateway node comprising:
 a receiver for receiving a message from a further network, the message comprising an explicit communication transfer indicator indicating that a communication session has been transferred from a first endpoint to a second endpoint, an indication of at least one of the endpoints and an indication of the communication transfer type;
 a processor for mapping the indication of the communication transfer type to a further indication of the communication transfer type usable by the IP Multimedia Subsystem communication network to determine the type of transfer, wherein mapping the indication of the communication transfer type comprises mapping an alerting type to a blind parameter value and an active type to a consultative parameter value; and
 the processor being further arranged to generate a Session Initiation Protocol message, the Session Initiation Protocol message comprising an explicit communication transfer indicator indicating that a communication session has been transferred from a first endpoint to a second endpoint, an indication of at least one of the endpoints and the further indication of the communication transfer type.

* * * * *